United States Patent [19]

Sanders, Jr.

[11] 4,247,330

[45] Jan. 27, 1981

[54] PROTECTIVE COATINGS

[75] Inventor: Albert J. Sanders, Jr., Toledo, Ohio

[73] Assignee: SWS Silicones Corporation, Adrian, Mich.

[21] Appl. No.: 50,389

[22] Filed: Jun. 20, 1979

[51] Int. Cl.$^3$ .............................................. C09G 1/18
[52] U.S. Cl. ................................. 106/3; 106/287.11; 106/287.13
[58] Field of Search .............. 106/3, 287.11, 287.13; 260/29.1 SB

[56] References Cited

U.S. PATENT DOCUMENTS

| 3,508,933 | 4/1970 | Yates | 106/11 |
|---|---|---|---|
| 3,544,498 | 12/1970 | Holdstock et al. | 528/26 |
| 3,551,168 | 12/1970 | Atherton et al. | 106/11 |
| 3,702,769 | 11/1972 | Vaughn | 528/34 |
| 3,817,889 | 6/1974 | Fink et al. | 528/38 |
| 3,852,075 | 12/1974 | Basadur | 106/287.11 |
| 3,890,269 | 6/1975 | Martin | 528/33 |
| 3,960,575 | 6/1976 | Martin | 106/287.11 |

*Primary Examiner*—Lorenzo B. Hayes
*Assistant Examiner*—Amelia B. Yarbrough

[57] ABSTRACT

An aqueous emulsion containing (1) a mixture of silicone compounds consisting of (a) an aminofunctional silicone fluid and (b) a cyclic siloxane, (2) an aliphatic alcohol having from 1 to 4 carbon atoms, (3) sufficient carboxylic acid to neutralize the aminofunctional group and (4) cationic emulsifying agents, if desired. These aqueous emulsions are storage stable and are suitable for dispensing in automatic car washes to impart a detergent resistant protective coating on hard surfaces.

7 Claims, No Drawings

PROTECTIVE COATINGS

The present invention relates to protective coatings for hard surfaces and more particularly to compositions which may be dispensed by automatic car washes to provide improved water beading and detergent resistance to hard surfaces coated therewith.

BACKGROUND OF THE INVENTION

Protective coatings for hard surfaces, especially polish compositions are known in the art. U.S. Pat. No. 3,960,575 to Martin, for example, described detergent resistant polish compositions, in which an aminofunctional silicone fluid and hydroxyl-terminated organopolysiloxanes and/or silicone resins are added to polish compositions containing waxes. Also, U.S. Pat. No. 3,508,933 to Yates described an automobile polish which contains the reaction product of a hydroxyl terminated polydimethylsiloxane and an aminoalkoxysilane. U.S. Pat. No. 3,544,498 to Holdstock et al described a detergent resistant polish containing a partial amine salt of a copolymer which is obtained from the partial hydrolysis and condensation of a silanol end-blocked polydimethylsiloxane having 5 siloxy units, an aminoalkyltrialkoxysilane and an aminoalkoxyalkyltrialkoxysilane and a copolymer obtained from the partial hydrolysis and condensation of a silanol end-blocked polydimethylsiloxane having 800 dimethylsiloxy units with an aminoalkoxyalkenyltrialkoxysilane. Also, U.S. Pat. No. 3,817,889 to Fink et al describes a detergent resistant composition containing hydroxyl-terminated organopolysiloxanes and methylsiloxanes having amine groups linked to the SiO groups of the methylsiloxanes through a bivalent hydrocarbon radical and an organic tin catalyst.

Hard surface coating compositions which may be used in the rinse operations of car wash establishments are described in U.S. Pat. No. 3,852,075 to Basadur. These coating compositions comprise an aqueous dispersion of an amine functional dimethylpolysiloxane, a non-volatile mineral oil and cationic emulsifiers. U.S. Pat. No. 3,551,168 to Atherton et al also describes a protective polish for auto laundries comprising dicoco dimethyl quaternary ammonium salts, an ethoxylated tertiary amine, an emulsified mineral oil and a methyl silicone fluid.

Polish compositions which are useful for cleaning, protecting and polishing leather products are described in U.S. Pat. No. 3,702,769 to Vaughn. These compositions consist of an emulsion of water, a solvent, a wax, an emulsifier and the reaction product of hydroxyl end-blocked siloxanes and aminofunctional silanes.

Many of the aqueous emulsions known heretofore have a tendency to gel or separate on storage and/or when subjected to freezing or elevated temperatures. This is particularly serious, especially in compositions which are to be used in automatic car washes where a uniform composition is essential in order to obtain optimum protection and appearance. Thus, emulsions which are not storage stable are generally ineffective and unsatisfactory as coating compositions.

Moreover, it is essential that the coating composition impart detergent resistance and that it improves the gloss of the treated surface. Furthermore, it is essential that the surface be detergent resistant after only one application and that the surface retain its gloss for a period of time.

Likewise, it is essential that the coating composition be storage stable in order that they will perform satisfactorily in automatic car washes. Also, it is essential that the compositions form a hydrophobic coating which causes water on the surface to form beads and thereby facilitate drying.

It has been found that aqueous emulsions containing aminofunctional silicone fluids can be made storage stable by incorporating cyclic siloxanes in the emulsions. Moreover these emulsions provide an improved hydrophobic and detergent resistance coating to the treated surfaces.

Therefore, it is an object of this invention to provide a detergent resistant composition for hard surfaces. Another object of this invention is to provide a composition which imparts gloss to the treated surface after only one application. Still another object of this invention is to provide a stable aqueous composition which may be used in automatic car washes. A further object of this invention is to provide stable aqueous compositions which when applied during the rinse operation at an automatic car wash causes water beading on the surface of cars and thereby facilitate drying.

SUMMARY OF INVENTION

The foregoing objects and others which will become apparent from the following description are accomplished in accordance with this invention generally speaking, by providing an aqueous emulsion containing (1) a mixture of silicone compounds consisting of (a) an aminofunctional silicone fluid and (b) a cyclic siloxane, (2) an aliphatic alcohol having from 1 to 4 carbon atoms, (3) sufficient carboxylic acid to neutralize the aminofunctional group and (4) cationic emulsifying agents, if desired. In preparing these aqueous emulsions, the aminofunctional fluid (a) cyclic siloxane (b), aliphatic alcohol (2) and carboxylic acid (3) are emulsified in the presence of water. It is preferred that cationic emulsifying agents be incorporated in the emulsions of this invention.

DETAILED DESCRIPTION OF THE INVENTION

Aminofunctional silicone fluids (a) employed in the aqueous emulsion of this invention may be prepared by equilibrating a mixture containing an organopolysiloxane and an aminofunctional silane or siloxane in the presence of an equilibration catalyst. Organopolysiloxanes which may be used in the preparation of these aminofunctional silicone fluids are cyclic siloxanes of the general formula

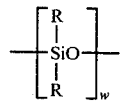

or linear or branched organopolysiloxanes having the general formula

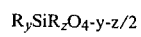

in which R represents monovalent hydrocarbon radicals having from 1 to 18 carbon atoms, y is a number of from about 0.5 to 3.0, z is a number of from 0.001 to 1 and the sum of y and z is a number of from 1 to 3.0 and w is a number of from 3 to 10.

Examples of suitable cyclic organopolysiloxanes which may be used in the formation of these aminofunctional silicone fluids are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which w has a value of from 3 to 4 are preferred.

Examples of linear or branched chained siloxanes which may be used are triorganosiloxy end-blocked organopolysiloxanes such as trimethylsiloxy end-blocked dimethylpolysiloxanes, diethylpolysiloxanes, methylphenylpolysiloxanes, diphenylpolysiloxanes and copolymers thereof.

The aminofunctional silanes or siloxanes which are reacted with the organopolysiloxanes may be represented by the general formula

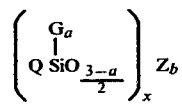

in which G represents the radicals, R, OR', OR" NR'$_2$, or OSiR$_3$ in which R is the same as R above, R' represents hydrogen or monovalent hydrocarbon radicals having from 1 to 18 carbon atoms, R" is a substituted or unsubstituted divalent hydrocarbon radical having from 1 to 18 carbon atoms, a substituted or unsubstituted divalent hydrocarbonoxy radical in which the oxygen is in the form of an ether linkage or an unsaturated divalent hydrocarbon radical, Q represents the radicals

Z is a radical selected from the group consisting of R'O$_{0.5}$, R$_3$SiO$_{0.5}$ and R'$_2$NR"O$_{0.5}$ in which R, R' and R" are the same as above, a is a number of from 0 to 2, b is a number of from 0 to 3 and x is a number of from 1 to 20,000.

Examples of suitable divalent radicals represented by R" are hydrocarbon radicals having from 2 to 18 carbon atoms such as ethylene, trimethylene, tetramethylene, hexamethylene, octamethylene; hydrocarbonoxy radicals having the formula

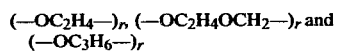

in which r is a number of from 1 to 50 such as ethylene oxide, trimethylene oxide and polymers thereof and alkylene radicals such as vinylene, propenylene, butenylene, hexenylene and the like.

Examples of suitable aminofunctional silanes are betaaminopropyltriethoxysilane, gamma-aminopropyltrimethoxysilane, methyl-beta-(aminoethyl) gamma-aminopropyldimethoxysilane, omega-aminohexyltributoxysilane, beta-(aminoethoxy) hexyltriethoxysilane, beta-(aminopropoxy)butyltributoxysilane, methyl-beta-(aminopropoxy)propyldi-(aminoethoxy)silane,

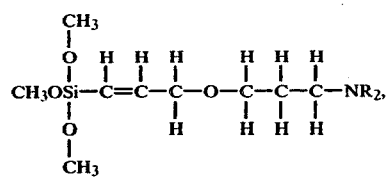

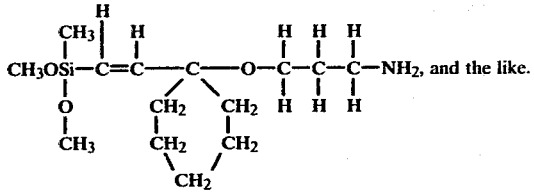

Repesentative examples of aminofunctional siloxanes are

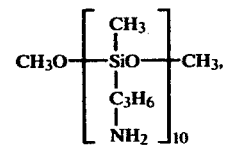

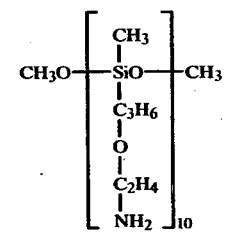

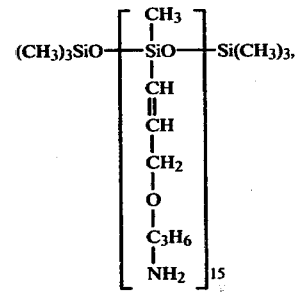

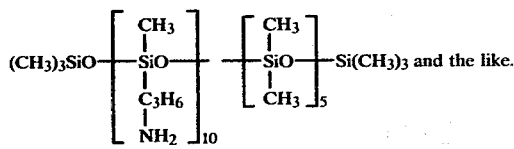

The aminofunctional silicone fluids and methods for preparing the same are described in U.S. Pat. No. 3,890,269 to Martin, which is incorporated herein by reference.

The viscosity of the aminofunctional silicone fluids employed in the compositions of this invention may range from about 5 up to about 100,000 cs. at 25° C., preferably from about 50 to 50,000 cs. and more preferably from about 100 to 20,000 cs. at 25° C.

Cyclic siloxanes (b) employed in the aqueous emulsions of this invention may be represented by the general formula

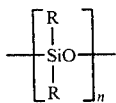

wherein the R(s), which may be the same or different, represent monovalent hydrocarbon radicals having from 1 to 18 carbon atoms and n is a number of from 3 to 8.

Radicals represented by R are alkyl radicals, e.g., methyl, ethyl, propyl, butyl, octyl, dodecyl and octadecyl; aryl radicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl radicals; alkaryl radicals, e.g., tolyl, xylyl and ethylphenyl radicals; aralkyl radicals, e.g., benzyl, alpha-phenylethyl, beta-phenylethyl and alpha-phenylbutyl radicals and the like.

Examples of suitable cyclic siloxanes which may be emulsified with the aminofunctional silicone fluids are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane, decamethylcyclopentasiloxane, dodecamethylcyclohexasiloxane, tetradecamethylcycloheptasiloxane and hexadecamethylcyclooctasiloxane.

Suitable examples of aliphatic alcohols (2) having up to 4 carbon atoms which may be employed in the composition of this invention are methanol, ethanol, n-propanol, isopropanol, n-butanol, sec-butanol and tert-butanol. It is preferred that the aliphatic alcohols be soluble in water.

Examples of carboxylic acids (3) having up to 10 carbon atoms which may be used to neutralize the amino group bonded to the aminofunctional silicone fluid (a) are monocarboxylic acids such as formic acid, acetic acid, propionic acid, butanoic acid, n-pentanoic acid, hexanoic acid, octanoic acid and decanoic acid.

Various cationic emulsifying agents may be employed in the compositions of this invention if desired, to enhance the formation and/or improve the stability of the aqueous emulsions. Examples of suitable emulsifying agents are cationic emulsifiers such as quaternary ammonium salts having one or two alkyl groups of from 8 to 18 carbon atoms. Examples of suitable emulsifiers are dicoco dimethyl quarternary ammonium chloride, dihydrogenated tallow dimethyl quaternary ammonium chloride, dicoco diethyl ammonium sulfate and n-alkyl trimethyl ammonium halides such as dodecyl trimethyl ammonium bromide and coconut trimethyl ammonium chloride. Other cationic emulsifiers which may be used are the condensation products of primary amines with ethylene and propylene oxides, such as those obtained from the reaction of tallow amine with from 2 to 15 mols of ethylene oxide per mol of amine, coconut amine with from 2 to 15 mols of ethylene oxide per mol of amine, and tallow diamine reacted with from 30 to 60 mols of ethylene oxide per mol of amine. Additional cationic emulsifiers which may be employed are those obtained from the reaction of primary fatty acids containing from 6 to 24 carbon atoms with alkylene polyamines or alkyolamines.

The above cationic emulsifiers may be used in combination with nonionic emulsifiers such as polyoxyethylene alkyl phenols, nonylphenoxypoly(ethyleneoxy) ethanols (available from General Aniline and Film Corporation), polyoxyethylene sorbitol hexastearate, polyoxyethylene(2 mol) cetyl ether (available from Imperial Chemical Industries of America), trimethyl nonyl ether of polyethylene glycol, (molecular weight about 626, and containing from 6 to 14 ethylene oxide radicals per molecule, available as TERGITOL TMN-10 from Union Carbide Corporation), polyoxyethylene sorbitol oleate (saponification number 102–108 and hydroxyl number 25–35, available as ATLOX 1087 from Imperial Chemical Industries of America).

The amount of cationic emulsifying agents which may be employed in the aqueous emulsions of this invention may range from 0 to 30 percent and more preferably from about 5 to 20 percent by weight based on the total weight of the emulsion, i.e., silicone compounds (1), alcohol (2), emulsifying agent (4) and water.

The silicone compounds are present in the aqueous emulsion in an amount of from 0.02 to 95 percent by weight, preferably from 5 to 60 percent by weight and more preferably from 5 to 40 percent by weight based on the weight of the composition, i.e., silicone compounds (1), alcohol (2), emulsifying agent and water. For optimum results, the aqueous composition preferably contains from 5 to 35 percent by weight of silicone compounds based on the weight of silicone compounds, alcohol, emulsifying agent and water. By silicone compounds we mean the aminofunctional silicone fluid (a) and the cyclic siloxane (b).

The ratio of aminofunctional silicone fluid to cyclic siloxane present in the mixture of silicone compounds is not critical and may range from about 1:1 to 1:4 as well as 4:1, preferably 1:1.5 on a weight basis.

The amount of aliphatic alcohol present in the aqueous emulsion is not critical and may range from about 1 to 20 percent by weight and more preferably from 5 to 15 percent by weight based on the weight of the mixture of silicone compounds (1), alcohol (2), emulsifying agent (4) and water.

A sufficient amount of carboxylic acid should be added to the composition to substantially neutralize the amine groups bonded to the aminofunctional silicone fluids. Generally, these fluids have a base equivalent of from about 0.05 to 2.25, preferably from 0.1 to 2.0 and more preferably from 0.5 to 1.8 milliequivalents per gram of aminofunctional silicone fluid; therefore it is preferred that a substantially equivalent amount of carboxylic acid be employed to neutralize the aminofunctional silicone fluids present in the composition. Although it is preferred that all the amine groups be neutralized, it is not essential in order to prepare a stable aqueous emulsion. Moreover, the neutralized aminofunctional silicone fluids will likewise act as emulsifiers and aid in the formation of stable aqueous emulsions.

The amount of water present in the composition is primarily dependend on the concentration desired and upon the type of equipment used in the application. In certain applications, it is preferred to use a higher concentration than in other applications. Generally the amount of water will range from about 3 to 90 percent by weight and more preferably from about 10 to 80 percent by weight based on the weight of the composition i.e., silicone compounds, alcohol, emulsifying agent and water.

Other ingredients such as preservatives, e.g., formaldehyde and 6-acetoxy-2,4-dimethyl-m-dioxane, antifoams and coloring agents may be added in minor amounts to the composition of this invention.

The coating compositions of this invention may be prepared in any conventional manner. Preferably it is prepared in a mechanical mixing apparatus by adding the aliphatic alcohol and carboxylic acid to the aminofunctional silicone fluid and cyclic siloxane to form a homogeneous mixture, then adding water with continuous mixing and thereafter adding the emulsifying agent, if desired, to the resultant composition. Depending on the final concentration, additional water may be added to the composition with agitation to form a homogeneous composition.

The aqueous emulsions may be prepared as a concentrate and later diluted with water to the desired concentration. When the concentrate is further diluted with water, it is preferred that the silicone content be above about 0.02 percent by weight based on the total weight of the emulsion in order to obtain a satisfactory coating.

The emulsion concentrate may be used in an automatic car wash where it is automatically dispensed into a stream of water and applied to the surface of a car to provide a hydrophobic and detergent resistant coating thereon.

The compositions of this invention may be applied to hard surfaces, especially metal surfaces, to improve their resistance to detergents. Also, these compositions are storage stable and may be used in an automatic car wash to enhance water beading and facilitate drying.

In the following examples all parts are by weight unless otherwise specified.

PREPARATION OF AMINOFUNCTIONAL SILICONE FLUIDS (A) An aminofunctional silicone fluid is prepared by heating a mixture containing about 266.4 parts of octamethylcyclotetrasiloxane, 22.4 parts of beta-(aminoethyl)-gamma-aminopropyltrimethoxysilane and 0.29 part of potassium hydroxide to a temperature of 145° C. for three hours. After cooling the liquid product to room temperature 0.29 part of acetic acid is added to neutralize the catalyst. The product is filtered and a liquid product having a viscosity of about 40 cs. at 25° C. is recovered. Nuclear Magnetic Resonance (N.M.R.) analysis indicates that the ratio of beta-(aminoethyl)-gamma-aminopropyl or $OCH_3$ to $(CH_3)_2SiO$ groups is about 1:3:36.

(B) An aminofunctional silicone fluid is prepared by reacting 9 parts of beta-(aminoethoxy)propyltrimethoxysilane, 316 parts of hexamethylcyclotrisiloxane and 0.3 part of n-butyllithium at a temperature of about 125° C. The resultant product which is neutralized with 0.3 part of acetic acid has a viscosity of about 125 cs. at 25° C. The ratio of beta-(aminoethoxy)propyl groups to $OCH_3$ groups to $(CH_3)_2$ SiO groups is about 1:3.1:98.

(C) An aminofunctional silicone fluid is prepared by mixing 30 parts of a silanol chain-stopped polydimethylsiloxane of the formula

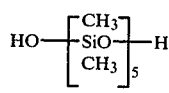

with 7.5 parts of 3-(3-aminopropoxy)propyltrimethoxysilane and about 12 parts of gamma-aminopropyltrimethoxysilane. The reaction mixture is thoroughly agitated and then 0.35 part of water is added with agitation. The resulting organopolysiloxane copolymer has a viscosity of about 150 cs. at 25° C.

EXAMPLE 1

An aqueous emulsion is prepared by adding 0.28 part of acetic acid to a mechanical mixer containing 10 parts of aminofunctional silicone fluid prepared in accordance with (A) above, and 10 parts of octamethylcyclotetrasiloxane. The ingredients are mixed for 5 minutes, then 10 parts of ethanol are added to the mixture consisting of acetic acid, octamethylcyclosiloxane and aminofunctional fluid and mixed until homogeneous. About 53 parts of water are then added in increments over a 5 minute period of time with continuous agitation to form a white milky composition. A sample of the resultant emulsion is heated for 13 days at 50° C., while a similar sample is subjected to 4 cycles of a freeze-thaw test at temperatures ranging from −20° C. to +25° C. without any appearance of phase separation or gelling.

About 16 parts of dicoco dimethyl quaternary ammonium chloride, 75 percent active (available from Armour and Company) are mixed with the resultant emulsion. Two parts of the resultant emulsion are mixed with 25 parts of water and applied to a car surface as a rinse. Rapid and excessive water beading is observed. The car surface is still hydrophobic after 5 detergent washings as evidenced by rapid water beading.

EXAMPLE 2

The procedure of Example 1 is repeated except that the aminofunctional silicone fluid prepared in accordance with (B) above is substituted for the aminofunctional silicone fluid prepared in accordance with (A) above. No phase separation is observed after heating for 13 days at 50° C. or when subjected to 4 cycles of a freeze-thaw test.

EXAMPLE 3

The procedure of Example 1 is repeated except that 6 parts of aminofunctional silicone fluid prepared in accordance with (A) above and 14 parts of octamethylcycloetetrasiloxane are employed. No phase separation is observed after heating for 13 days at 50° C. or when subjected to 4 cycles of a freeze-thaw test.

EXAMPLE 4

The procedure of Example 1 is repeated except that 14 parts of aminofunctional silicone fluid prepared in accordance with (A) above and 6 parts of octamethylcyclotetrasiloxane are employed. No phase separation is observed after heating for 13 days at 50° C. or when subjected to 4 cycles of a freeze-thaw test.

EXAMPLE 5

The procedure of Example 1 is repeated except that tert-butanol is substituted for the ethanol. No phase separation is observed after heating for 13 days at 50° C. or when subjected to 4 cycles of a freeze-thaw test.

EXAMPLE 6

The procedure of Example 1 is repeated except the 5 parts of hexamethylcyclotrisiloxane and 5 parts of octamethylcyclotetrasiloxane are substituted for 10 parts of octamethylcyclotetrasiloxane. No phase separation is observed after heating for 13 days at 50° C. or when subjected to 4 cycles of a freeze-thaw test.

EXAMPLE 7

The procedure of Example 1 is repeated except that 10 parts of decamethylcyclpentasiloxane are substituted for the octamethylcyclotetrasiloxane. No phase separation is observed after heating for 13 days at 50° C. or when subjected to 4 cycles of a freeze-thaw test.

EXAMPLE 8

The procedure of Example 1 is repeated except that 10 parts of a mixture of cyclic siloxanes having a weight ratio of hexamethylcyclotrisiloxane to octamethylcyclotetrasiloxane to decamethylcyclopentasiloxane of 1:0.5:1 are substituted for the 10 parts of octamethylcyclotetrasiloxane. No phase separation is observed after heating for 13 days at 50° C. or when subjected to 4 cycles of a freeze-thaw test.

EXAMPLE 9

The procedure of Example 1 is repeated except that 0.7 part of decanoic acid are substituted for the acetic acid. No phase separation is observed after heating for 13 days at 50° C. or when subjected to 4 cycles of a freeze-thaw test.

COMPARISON EXAMPLE $V_1$

The procedure of Example 1 is repeated except that the octamethylcyclotetrasiloxane is omitted. Separation into two phases is observed after 1 cycle of the freeze-thaw test.

COMPARISON EXAMPLE $V_2$

The procedure of Example 2 is repeated except that the octamethylcyclotetrasiloxane is omitted. Separation into two phases is observed after 2 cycles of the freeze-thaw test.

COMPARISON EXAMPLE $V_3$

The procedure of Example 1 is repeated except that 10 parts of the aminofunctional silicone fluid prepared in (C) above is substituted for the aminofunctional silicone fluid prepared in (A) above. Separation is observed after standing at room temperature for 24 hours. Also the composition separated into two phases after heating for 24 hours at 50° C. and gelled after 48 hours.

What is claimed is:

1. An aqueous emulsion consisting essentially of (1) a mixture of silicone compounds comprising (a) an aminofunctional silicone fluid and (b) a cyclic siloxane, in which the silicone compounds are present in an amount of from 0.02 to 95 percent by weight based on the weight of the emulsion, and the weight ratio of aminofunctional silicone fluid to cyclic siloxane is from 1:4 to 4:1, (2) from 1 to 20 percent by weight based on the weight of the emulsion of an aliphatic alcohol having from 1 to 4 carbon atoms, (3) sufficient monocarboxylic acid having up to 10 carbon atoms to substantially neutralize the amine groups bonded to the aminofunctional silicone fluid and (4) from 0 to 30 percent by weight based on the weight of the emulsion of a cationic emulsifying agent, said aminofunctional silicone fluid (a) is obtained from the equilibration of an organopolysiloxane and an aminofunctional silane or siloxane in the presence of a basic catalyst.

2. The emulsion of claim 1 wherein (1) the silicone compounds are present in an amount of from 5 to 60 percent by weight, based on the weight of the emulsion.

3. The emulsion of claim 1 wherein the organopolysiloxane used in the preparation of the aminofunctional silicone fluid (a) is represented by the formula

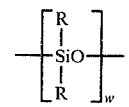

in which R is a monovalent hydrocarbon radical having from 1 to 18 carbon atoms and w is a number of from 3 to 10.

4. The emulsion of claim 1 wherein the organopolysiloxane used in the preparation of the aminofunctional silicone fluid (a) is represented by the formula $$R_y SiR_z O_{4-y-z/2}$$

in which R is a monovalent hydrocarbon radical, y is a number of from about 0.5 to 3.0, z is a number of from 0.001 to 1 and the sum of y and z is a number of from 1 to 3.0.

5. The emulsion of claim 1 wherein the aminofunctional silane or siloxane is represented by the formula

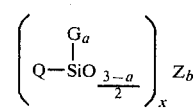

in which G is selected from the group consisting of R, OR', OSiR$_3$ and OR"NR'$_2$, in which R is a monovalent hydrocarbon radical having from 1 to 18 carbon atoms, R' is selected from the group consisting of hydrogen and monovalent hydrocarbon radicals having from 1 to 18 carbon atoms, R" is selected from the group consisting of substituted and unsubstituted divalent hydrocarbon radicals, substituted and unsubstituted divalent hydrocarbonoxy radicals in which the oxygen is in the form of an ether linkage and unsaturated divalent substituted and unsubstituted hydrocarbon radicals, Q is selected from the group consisting of

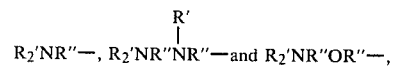

Z is selected from the class consisting of R'O$_{0.5}$, R$_3$SiO$_{0.5}$ and R'NR"O$_{0.5}$, a is a number of from 0 to 2, b is a number of from 0 to 3 and x is a number of from 1 to 20,000.

6. The emulsion of claim 1 wherein the alcohol is present in an amount of from 5 to 15 percent based on the weight of the emulsion.

7. The emulsion of claim 1 wherein the silicone compounds are present in an amount of from 5 to 40 percent by weight, (2) an alcohol having from 1 to 4 carbon atoms is present in an amount of from 5 to 15 percent by weight, (3) sufficient carboxylic acid to substantially neutralize amine groups bonded to the silicone compounds, (4) a cationic emulsifying agent is present in an amount of from 5 to 20 percent by weight, based on the weight of the emulsion with the balance of the emulsion being water.

* * * * *